US012791498B2

(12) United States Patent
Lee et al.

(10) Patent No.: US 12,791,498 B2
(45) Date of Patent: Nov. 10, 2026

(54) METHOD FOR CORRECTING THE NONLINEARITY ASSOCIATED WITH PHOTON COUNTING DETECTORS OF IMAGING DEVICES

(71) Applicant: Samsung HME America, Inc., Danvers, MA (US)

(72) Inventors: Duhgoon Lee, Andover, MA (US); Doil Kim, Gyeonggi-do (KR); Junyoung Park, Gyeonggi-do (KR); Ibrahim Bechwati, Waltham, MA (US)

(73) Assignee: Samsung HME America, Inc., Danvers, MA (US)

( * ) Notice: Subject to any disclaimer, the term of this patent is extended or adjusted under 35 U.S.C. 154(b) by 147 days.

(21) Appl. No.: 18/385,068

(22) Filed: Oct. 30, 2023

(65) Prior Publication Data

US 2024/0142393 A1 May 2, 2024

Related U.S. Application Data

(60) Provisional application No. 63/420,336, filed on Oct. 28, 2022.

(51) Int. Cl.
*G01N 23/046* (2018.01)
*G01N 23/083* (2018.01)
*H04N 25/30* (2023.01)

(52) U.S. Cl.
CPC ......... *G01N 23/046* (2013.01); *G01N 23/083* (2013.01); *H04N 25/30* (2023.01);
(Continued)

(58) Field of Classification Search
CPC .................................................... G01N 23/046
See application file for complete search history.

(56) References Cited

U.S. PATENT DOCUMENTS 6,148,057 A 11/2000 Urchuk et al.
2015/0223766 A1* 8/2015 Besson ................. G01T 1/2985 378/62
2019/0313993 A1* 10/2019 Zhou ...................... A61B 6/025

FOREIGN PATENT DOCUMENTS

WO WO 2009/043003 4/2009
WO WO 2014/028508 2/2014

* cited by examiner

*Primary Examiner* — Edwin C Gunberg
(74) *Attorney, Agent, or Firm* — Pandiscio & Pandiscio

(57) ABSTRACT

A method for calibrating an imaging device comprising a photon counting detector (PCD), the method comprising: providing (i) an X-ray source configured to emit an X-ray beam, (ii) a first detector array configured to be in alignment with the X-ray beam, wherein the first detector array comprises a plurality of energy integrating detectors (EID) for detecting the X-ray beam emitted by the X-ray source, and (iii) a second detector array configured to be in alignment with the X-ray beam, wherein the second detector array comprises a plurality of photo counting detectors (PCD) for detecting the X-ray beam emitted by the X-ray source; detecting an X-ray beam passed through an object to be scanned with the plurality of energy integrating detectors (EID); recording the X-ray beam passed through the object to be scanned and detected by the plurality of energy integrating detectors (EID) as a first data set; detecting an X-ray beam passed through the object to be scanned with the plurality of photo counting detectors (PCD); recording the X-ray beam passed through the object to be scanned and detected by the plurality of photo counting detectors (PCD) as a second data set; generating a mathematical model from the first data set and the second data set so as to derive an attenuation factor; and applying the attenuation factor to the second data set to calibrate the imaging device.

28 Claims, 9 Drawing Sheets

(52) U.S. Cl.
CPC ... *G01N 2223/20* (2013.01); *G01N 2223/303* (2013.01); *G01N 2223/501* (2013.01)

METHOD FOR CORRECTING THE NONLINEARITY ASSOCIATED WITH PHOTON COUNTING DETECTORS OF IMAGING DEVICES

REFERENCE TO PENDING PRIOR PATENT APPLICATION

This patent application claims benefit of prior U.S. Provisional Patent Application Ser. No. 63/420,336, filed Oct. 28, 2022 by NeuroLogica Corporation, a subsidiary of Samsung Electronics Co., Ltd. for COUNT CORRECTION METHOD FOR PHOTON COUNTING DETECTORS.

The above-identified patent application is hereby incorporated herein by reference.

FIELD OF THE INVENTION

This invention relates to imaging devices and detectors in general, and more particularly to computed tomography (CT) scanners and detectors for use with CT scanners.

BACKGROUND OF THE INVENTION

A typical imaging device (sometimes hereinafter referred to as a "scanner") comprises an energy source for emitting energy which interacts with the object being imaged, a set of detectors (sometimes hereinafter also referred to as "receptors") that measures the interaction between the emitted energy and the object being imaged, and a computation engine to extract the information from the measured data relating to the interaction between the emitted energy and the object being imaged.

The computation engine creates an image of the object that is imaged from the measured data. Computed tomography (CT) scanners, a common medical imaging device, use a polychromatic X-ray tube as an energy source to emit X-ray energy which interacts with the object that is to be scanned. With a CT scanner, the receptors are a set of X-ray detectors disposed diametrically opposite from the X-ray source (i.e., with the object to be imaged disposed between the X-ray source and the X-ray detectors). The X-ray detectors are configured to convert X-ray energy into an electric current that can be measured. The measured electric current is then used to create an image, and the computer assembles a plurality of segmented images into a 3D representation of the scanned object.

Energy Integrating Detectors (EID) are the most commonly used X-ray receptors used in medical X-ray imaging applications. In scanning applications utilizing Energy Integrating Detectors (EID), an X-ray source (e.g., an emitter configured to emit a polychromatic X-ray spectrum containing photons of different energy levels) is disposed opposite the EID with the object to be scanned disposed between the X-ray source and the EID. As the X-ray source emits X-rays, the photons of the emitted polychromatic X-ray spectrum interact with the object to be scanned before contacting the EID. The EID averages the responses from each X-ray photon weighted by its respective energy; i.e., each X-ray photon is converted into a light photon that can be measured using simple photodiodes. The number of light photons depends on the energy of the incident X-ray photons. EID's are also sometimes referred to as "indirect conversion detectors", since such detectors convert the X-ray to light which is, in turn, converted to electric current (e.g., by a photodiode).

Photo Counting Detectors (PCD) are re-emerging for use in X-ray receptors in the field of nuclear medical imaging. PCD's have been considered for use with medical imaging utilizing Computer Aided Detection (CAD) since the late 1990's. The PCD 5 captures each X-ray photon after the photon is emitted from the X-ray source and passes through the object to be scanned, and registers the energy level of that X-ray photon. The X-ray photon interacts with the PCD receptor and creates an electric pulse that is proportional to the energy level of the X-ray photon. In a binned mode, pulses can then be binned together and counted based on their heights (i.e., magnitudes). PCDs are sometimes also referred to as "direct conversion detectors" since they convert X-ray photons directly to electrical current.

Traditional X-ray detectors generally operate as EIDs, converting X-ray photons into light photons as a first step before converting the light photons into an electric current that can be measured. The number of light photons depends on the energy of the X-ray photons. A photodiode is used to convert the light photons into electric current, with the magnitude of the electric current being the weighted sum of the X-ray photon energies.

However, the "linearity" of the detector is essential to creating an accurate representation of the imaged object. Both EIDs and PCDs suffer from a certain inherent degree of nonlinearity. The nonlinearity of EID detectors is known in the art, and several solutions exist to help address it. However, the nonlinearity of PCDs is a new area of inquiry that has not yet been addressed in the art.

Nonlinearity causes severe artifacts in images obtained using PCDs. The nonlinearity in PCD detectors can be contributed to two effects: (i) pulse pileup and (ii) charge sharing.

Pulse pileup typically happens when the pulses from two X-ray photons add up to create a single pulse with higher magnitude than the pulses of the two X-ray photons in isolation. More particularly, pulse pileup is caused when two (or more) incident photons from the emitted X-ray beam hit the detector in such close proximity that their respective pulses merge together to create a single pulse having a higher magnitude then the actual magnitude of the two (or more) pulses taken in isolation. The new (aggregated) pulse will appear as if it is generated by a single photon having higher energy. If the resulting pulse magnitude is large enough it will be rejected (e.g., by an appropriate software algorithm); otherwise, it will be registered as a single photon with a higher energy level than it should be registered with, thereby causing a distortion in the resulting image.

Charge sharing is generally the opposite of pulse pileup. With charge sharing, the pulse from single X-ray photon is split over two detectors, resulting in two pulses with lower magnitudes than the actual pulse of the original single X-ray photon sought to be measured, thereby also causing a distortion in the resulting image.

More particularly, with charge sharing, the electron cloud associated with a single X-ray photon is detected by two adjacent detectors. The pulse charge will be split into two pulses, each having a smaller magnitude than the actual magnitude of the pulse from the single X-ray photon. This gives the false detection of two X-ray photons, each with lower energy, and at the same time loses the true (i.e., correct) information from the actual magnitude of the single X-ray photon. In binned mode (e.g., counting pulses based on their magnitudes), the charge sharing effect is reduced due to averaging the data across multiple adjacent detectors.

However, the charge sharing effect does contribute to the nonlinearity of the PCD array and therefore results in image distortion.

Thus there is a need for a new and improved method and apparatus for calibrating an imaging device and/or accounting for, and correcting for, nonlinearity encountered in the use of PCDs in X-ray scanning applications in order to improve resulting image quality.

SUMMARY OF THE INVENTION

The present invention comprises the provision and use of a new and improved method and apparatus for calibrating an imaging device and/or accounting for, and correcting for, nonlinearity encountered in the use of PCDs in X-ray scanning applications in order to improve resulting image quality.

In one preferred form of the invention, there is provided a method for correcting the nonlinearity associated with photon counting detectors (PCDs) of imaging devices, the method comprising:

- providing a first scanning device and a second scanning device, wherein each of the first and second scanning devices comprises an X-ray source configured to emit an X-ray beam and a detector array in alignment with the X-ray beam, wherein the detector array of the first scanning device comprises a plurality of energy integrating detectors (EID) and the detector array of the second scanning device comprises a plurality of photo counting detectors (PCD);
- detecting an X-ray beam passed through an object to be scanned with the plurality of energy integrating detectors (EID);
- detecting an X-ray beam passed through the object to be scanned with the plurality of photo counting detectors (PCD);
- recording the X-ray beam detected by the plurality of energy integrating detectors (EID) as a first data set;
- recording the X-ray beam detected by the plurality of photo counting detectors (PCD) as a second data set;
- creating a mathematical model using the first data set and the second data set;
- creating a data driven model to supplement the mathematical model, wherein the data driven model addresses limitations of the mathematical model and extends the correction range;
- applying the mathematical model and the data driven model to the second data set so as to derive an attenuation factor;
- applying the attenuation factor to the second data set; and
- generating a scan image of the object from the second data set.

In another preferred form of the invention, there is provided a method for correcting the nonlinearity associated with photon counting detectors (PCDs) of imaging devices, the method comprising:

- providing a scanning device comprising an X-ray source configured to emit an X-ray beam and a first detector array in alignment with the X-ray beam, wherein the first detector array comprises a plurality of energy integrating detectors (EID);
- detecting an X-ray beam passed through an object to be scanned with the plurality of energy integrating detectors (EID);
- recording the X-ray beam passed through the object to be scanned and detected by the plurality of energy integrating detectors (EID) as a first data set;
- replacing the first detector array with a second detector array, wherein the second detector array comprises a plurality of photo counting detectors (PCD);
- detecting an X-ray beam passed through the object to be scanned with the plurality of photo counting detectors (PCD);
- recording the X-ray beam passed through the object to be scanned and detected by the plurality of photo counting detectors (PCD) as a second data set;
- creating a correction model by analyzing the first data set and the second data set, wherein the correction model comprises an attenuation factor;
- applying the attenuation factor to the second data set; and
- generating a scan image of the object from the second data set.

In another preferred form of the invention, there is provided a system for correcting the nonlinearity associated with photon counting detectors (PCDs) of imaging devices, the system comprising:

- at least one scanning device comprising an X-ray source configured to emit an X-ray beam;
- a first detector array configured to be in alignment with the X-ray beam, wherein the first detector array comprises a plurality of energy integrating detectors (EID) for detecting the X-ray beam emitted by the X-ray source;
- a second detector array configured to be in alignment with the X-ray beam, wherein the second detector array comprises a plurality of photo counting detectors (PCD) for detecting the X-ray beam emitted by the X-ray source;
- a first data set representing an X-ray beam passed through an object and detected by the plurality of energy integrating detectors (EID);
- a second data set representing an X-ray beam passed through the object and detected by the plurality of photo counting detectors (PCD); and
- a computer configured to (i) generate a mathematical model from the first data set and the second data set so as to derive an attenuation factor, and (ii) apply the attenuation factor to the second data set, whereby to generate a scan image of the object from the second data set.

In another preferred form of the invention, there is provided a method for calibrating an imaging device comprising a photon counting detector (PCD), the method comprising:

- providing (i) an X-ray source configured to emit an X-ray beam, (ii) a first detector array configured to be in alignment with the X-ray beam, wherein the first detector array comprises a plurality of energy integrating detectors (EID) for detecting the X-ray beam emitted by the X-ray source, and (iii) a second detector array configured to be in alignment with the X-ray beam, wherein the second detector array comprises a plurality of photo counting detectors (PCD) for detecting the X-ray beam emitted by the X-ray source;
- detecting an X-ray beam passed through an object to be scanned with the plurality of energy integrating detectors (EID);
- recording the X-ray beam passed through the object to be scanned and detected by the plurality of energy integrating detectors (EID) as a first data set;
- detecting an X-ray beam passed through the object to be scanned with the plurality of photo counting detectors (PCD);

recording the X-ray beam passed through the object to be scanned and detected by the plurality of photo counting detectors (PCD) as a second data set;

generating a mathematical model from the first data set and the second data set so as to derive an attenuation factor; and applying the attenuation factor to the second data set to calibrate the imaging device.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Computerized Tomography (CT) In many situations it can be desirable to image the interior of opaque objects. By way of example but not limitation, in the medical field, it can be desirable to image the interior of a patient's body so as to allow viewing of internal structures without physically penetrating the skin of the patient.

Computerized Tomography (CT) has emerged as a key imaging modality in the medical field. CT imaging machines generally operate by directing X-rays into the body from a variety of positions, detecting the X-rays passing through the body, and then processing the detected X-rays so as to build a three-dimensional (3D) data set of the patient's anatomy. This 3D data set can then be processed so as to create a 3D computer model of the patient's anatomy. The 3D data set and 3D computer model can then be visualized so as to provide images (e.g., slice images, 3D computer images, etc.) of the patient's anatomy.

Figure 1:
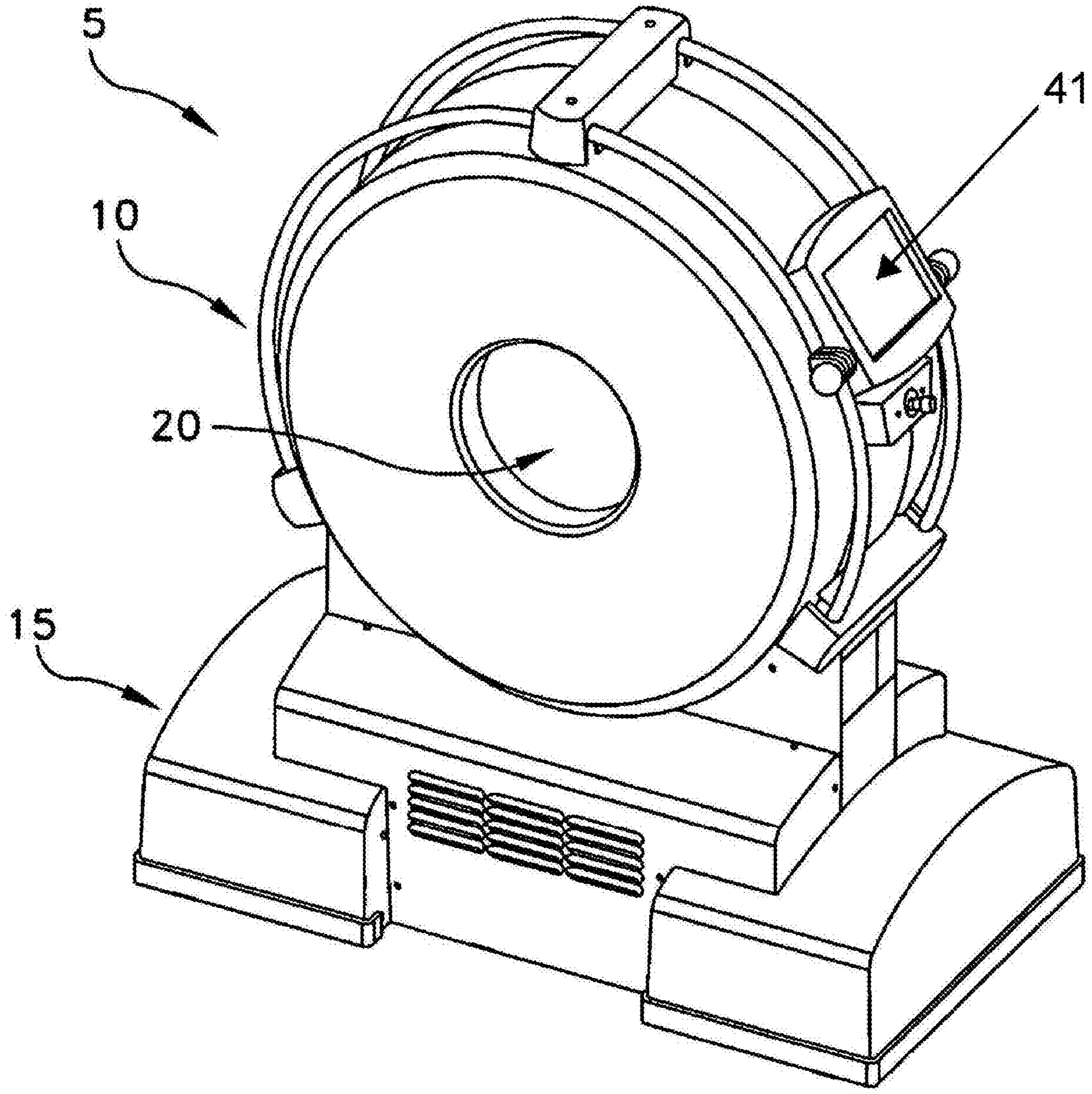
FIGS. 1 and 2 are schematic views showing the exterior of an exemplary CT imaging machine.
Figure 2:
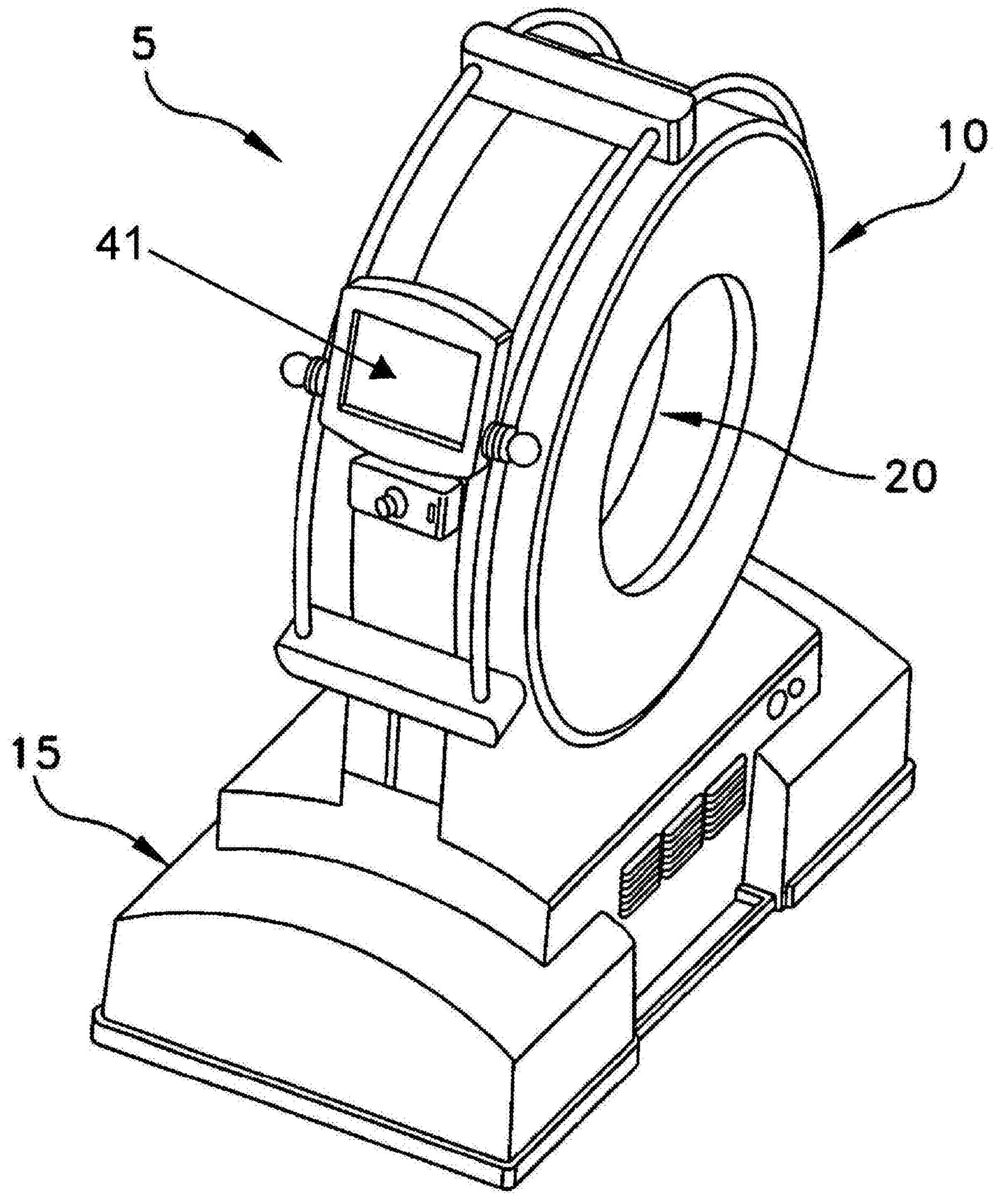

By way of example but not limitation, and looking now at FIGS. 1 and 2, there is shown an exemplary CT imaging machine 5. CT imaging machine 5 generally comprises a torus 10 which is supported by a base 15. A center opening 20 is formed in torus 10. Center opening 20 receives the patient anatomy which is to be scanned.

Figure 3:
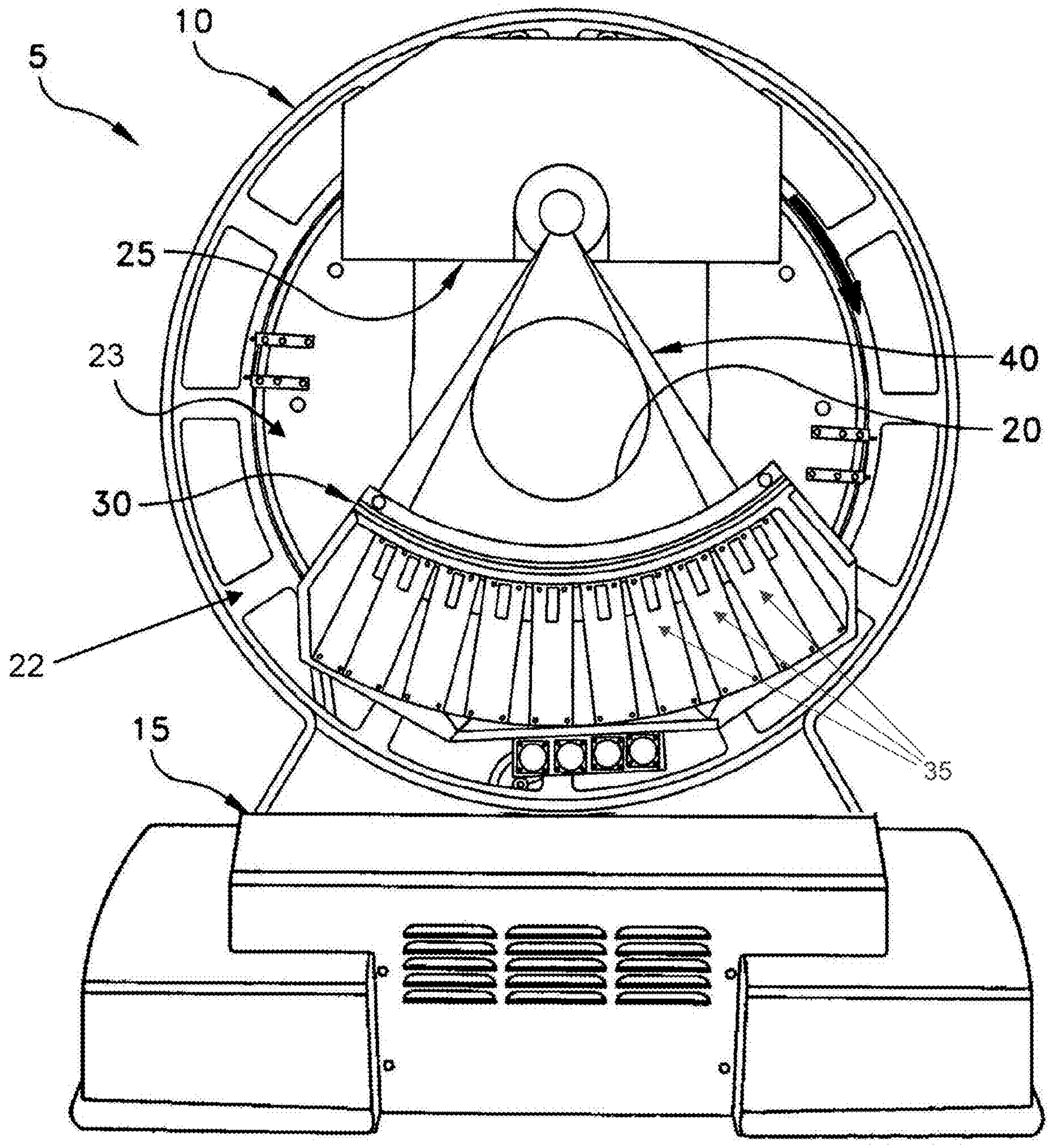
FIG. 3 is a schematic view showing various components in the torus of the exemplary CT imaging machine shown in FIGS. 1 and 2.

Looking next at FIG. 3, torus 10 generally comprises a fixed gantry 22, a rotating disc 23, an X-ray tube assembly 25 and an X-ray detector assembly 30. X-ray detector assembly 30 comprises a plurality of X-ray detectors 35. More particularly, fixed gantry 22 is disposed concentrically about center opening 20. Rotating disc 23 is rotatably mounted to fixed gantry 22. X-ray tube assembly 25 and X-ray detector assembly 30 are mounted to rotating disc 23 in diametrically-opposing relation, such that an X-ray beam 40 (generated by X-ray tube assembly 25 and detected by X-ray detectors 35 of X-ray detector assembly 30) is passed through the patient anatomy disposed in center opening 20. Inasmuch as X-ray tube assembly 25 and X-ray detector assembly 30 are mounted on rotating disc 23 so that they are rotated concentrically about center opening 20, X-ray beam 40 will be passed through the patient's anatomy along a full range of radial positions, so as to enable CT imaging machine 5 to create a "slice" image of the anatomy penetrated by the X-ray beam. Furthermore, by moving the patient and CT imaging machine 5 relative to one another during scanning, a series of slice images can be acquired, and thereafter appropriately processed, so as to create a 3D data set of the scanned anatomy. This 3D data set can then be processed so as to create a 3D computer model of the scanned anatomy. It is common to configure X-ray detector assembly 30 so that multiple slices of images (e.g., 8 slices, 16 slices, 32 slices, etc.) may be acquired with each rotation of rotating disc 23, whereby to speed up the acquisition of scan data.

In practice, it is now common to effect helical scanning of the patient's anatomy so as to generate a 3D data set of the scanned anatomy, which can then be processed so as to create a 3D computer model of the scanned anatomy. The 3D data set and 3D computer model can then be visualized so as to provide images (e.g., slice images, 3D computer images, etc.) of the patient's anatomy.

The various electronic hardware and software for controlling the operation of rotating disc 23, X-ray tube assembly 25 and X-ray detector assembly 30, as well as for processing the acquired scan data so as to generate the desired slice images, 3D data set and 3D computer model, may be of the sort well known in the art and may be located in torus 10 and/or base 15.

The images produced by CT imaging machine 5 may be viewed on a display screen 41 provided on CT imaging machine 5 or on a remote screen (not shown).

X-ray beam 40 is preferably a polychromatic X-ray beam. The interaction between X-ray beam 40 and the object to be scanned is the attenuation of the X-ray beam by the imaged object. The X-ray detectors 35 of X-ray detector assembly 30 are preferably X-ray semiconductor detectors that measure the attenuation level of X-ray beam 40 after it has passed through the object being scanned.

The Invention

The present invention addresses nonlinear behavior of an imaging device utilizing a photo counting detector (PCD) in order to improve image quality.

More particularly, the present invention is based on converting the severely non-linear measurements of a PCD X-ray detector 45 into a more suitable form of measurement with non-linear behavior similar to that of an EID X-ray detector 50. This is accomplished by providing an accurate estimate of the pulse pileup, and then correcting for the non-linear behavior of PCD X-ray detector 45 using the data from a well-established (e.g., standardized) EID X-ray detector 50.

In summary, the three key steps of the novel method of the present invention are:

1. Scan an object while collecting data using a standardized EID X-ray detector 50 and a PCD X-ray detector 45. The data collected from EID X-ray detector 50 can thereafter be used to estimate the counts of PCD X-ray detector 45 using a mathematical model generated to represent the pulse pileup of PCD X-ray detector 45.
2. Generate the mathematical model to represent the pulse pileup of PCD X-ray detector 45. The mathematical model is used for correcting the nonlinear behavior of the detectors.
3. Use a data-driven estimate to complement the mathematical model.

Collecting Data Using EID X-ray Detectors 50

The first step of the novel method of the present invention is to collect data using non-PCD detectors exhibiting well-known behavior. By way of example but not limitation, EID X-ray detector 50 may be used to collect data.

However, it should be appreciated that the data that is going to be used to correct for nonlinearity of PCD X-ray detector(s) 45 should be acquired using the same CT imaging machine 5 that is going to employ those PCD X-ray detector(s) 45. For example, the particular CT imaging machine 5 (or two identical CT imaging machines 5 of the same make and model) is ideal.

Figure 4:
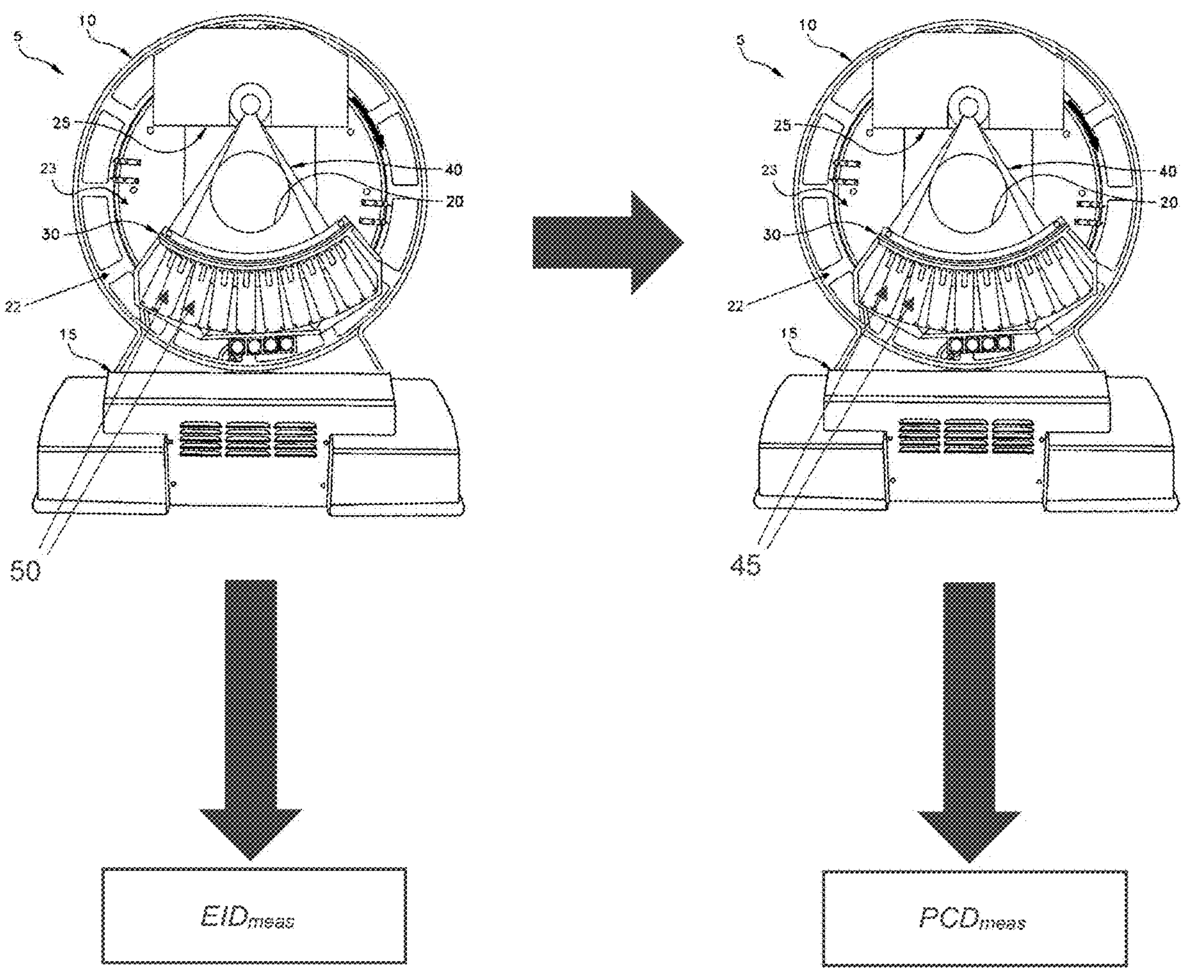
FIG. 4 is a schematic view showing how a single CT imaging machine may be used to image an exemplary object and obtain data from two different types of detectors.

Looking now at FIG. 4, one method for of achieving correction for nonlinearity using the same particular CT imaging machine 5 comprises replacing the X-ray detector assembly 30 used in that particular CT imaging machine 5 with a second X-ray detector assembly 30. That is, performing a first set of scans using an X-ray detector assembly 30 comprising a plurality of standardized EID X-ray detectors 50, and then performing a second set of scans using an X-ray detector assembly 30*a* comprising a plurality of PCD X-ray detectors 45.

Figure 5A:
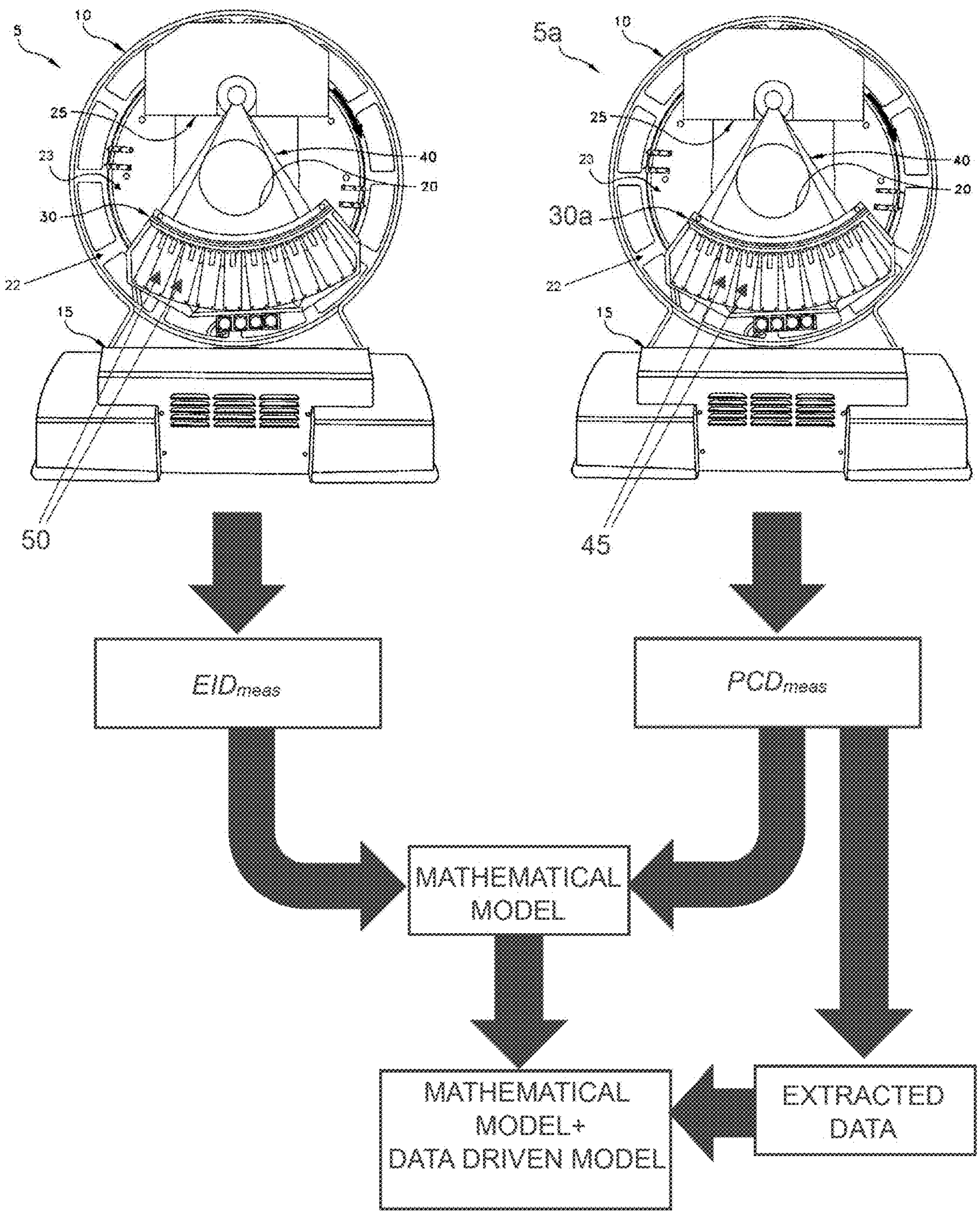
FIG. 5A is a schematic view showing a novel method for calibrating a CT machine using detector data obtained using two different types of detectors.

However, and looking now at FIG. 5A, a more convenient (and efficient) method is to use two CT imaging machines 5 and 5*a*. According to this method of the present invention, one CT imaging machine 5 is provided with an X-ray detector assembly 30 comprising a plurality of traditional EID X-ray detectors 50, and the other CT imaging machine 5*a* is provided with an X-ray detector assembly 30*a* comprising a plurality of PCD X-ray detectors 45. The two CT imaging machines 5, 5*a* should have the same geometric dimensions, and use the same electronic and mechanical components. In short the two CT imaging machines 5, 5*a* should be of the same make and model, with the only substantive difference between the machines being the type of X-ray detectors making up their respective detector assemblies 30, 30*a*.

Having CT imaging machines 5, 5*a* configured with identical hardware (except for their respective detector assemblies 30, 30*a*) is necessary but not sufficient. The other requirement is to acquire the data using the same settings on both CT imaging machines 5, 5*a*. The data should be acquired using the same voltage applied to X-ray tube assembly 25, the same current applied to X-ray tube assembly 25, and the same acquisition time.

EID X-ray detector 50 is selected for use as the standardized detector because it provides the most accurate representation of the scanned object.

Generating the Mathematical Model of Pulse Pileup of PCD

Still looking at FIG. 5A, EID X-ray detector(s) 50 provides an accurate representation of the scanned object. However, because of the nonlinearity problem discussed above, PCD X-ray detector(s) 45 do not provide an accurate representation of the scanned object. The present invention therefore provides a novel method comprising the generation of a mathematical model that helps "map" PCD X-ray detector 45 into the space of EID X-ray detector 50. Stated another way, the mathematical model of the present invention (which is sometimes referred to herein as a binned pixel correction (BPC) model) is used to map PCD detector 45 into a more suitable space:

$$PCD_{corr} = f(PCD_{meas}, EID_{meas}, Scanner_{params})$$

$PCD_{corr}$ is the corrected PCD data.

$PCD_{meas}$ is the measured PCD data.

$EID_{meas}$ is the measured EID data.

$Scanner_{params}$ is a set of scanner specific parameters.

The measured data consists of several large data sets, each several millions points long. The measured data from each set are analyzed and processed to create significant representatives that are then used to create the mathematical model.

Using the non-paralyzable model where the recorded count rate ($A_{rec}$), is a function of the incident count rate ($A_{inc}$) and $\tau$ is the dead time:

$$A_{rec} = \frac{A_{inc}}{1 + \tau \times A_{inc}}$$

The reference value R is an indirect measurement of the incident rate ($A_{inc}$). The recorded count rate is the product of a single acquisition count M multiplied by the number of acquisitions per second, $N_{acq}$:

$$A_{inc} = N_{acq} \times k \times R$$

$$A_{rec} = N_{acq} \times M$$

Where k, is a proportionality constant. The final mathematical model can be written as a function of R and M:

$$\frac{1}{M} = \frac{1}{k} \times \frac{1}{R} + \tau_c$$

$\tau_c$ is the total dead time per second. Using the Least Square Estimate is used to estimate the two constants, k and $\tau_c$.

Data Driven Function

The mathematical model generated above has its limitations. In order to improve the accuracy of the correction of the PCD data, data is extracted from the measured PCD data (e.g., data indicative of an unreliable outlier) and the remaining data is used to generate a data driven model. The data driven model is also used to extend the range of the correction. The data driven model used for the extended correction is as follows:

$$PCD_{corr} = g(PCD_{meas1}, PCD_{meas2}, \ldots, PCD_{measn})$$

Correction

Using the two functions described above (i.e., the mathematical model and the data driven model), attenuations measured by PCD X-ray detectors 45 are corrected so as to generate a more accurate set of data. The "corrected" data will have the same nonlinearity as that of EID X-ray detector 45. After applying the "correction" (i.e., the mathematical model and the data driven model), the tools that are suitable for creating an accurate image (e.g., the computer that assembles the 3D image from a plurality of scan images, etc.) are configured to utilize the PCD "corrected" measurements to generate the image. The PCD X-ray detector measurement ($M_{rec}$) can then be used with the reference data ($R_{rec}$) to generate the corrected attenuation:

$$\text{Corrected Ray Sum} = -\ln\left(\frac{f^{-1}(M_{rec})}{R_{rec}}\right)$$

Figure 5B:
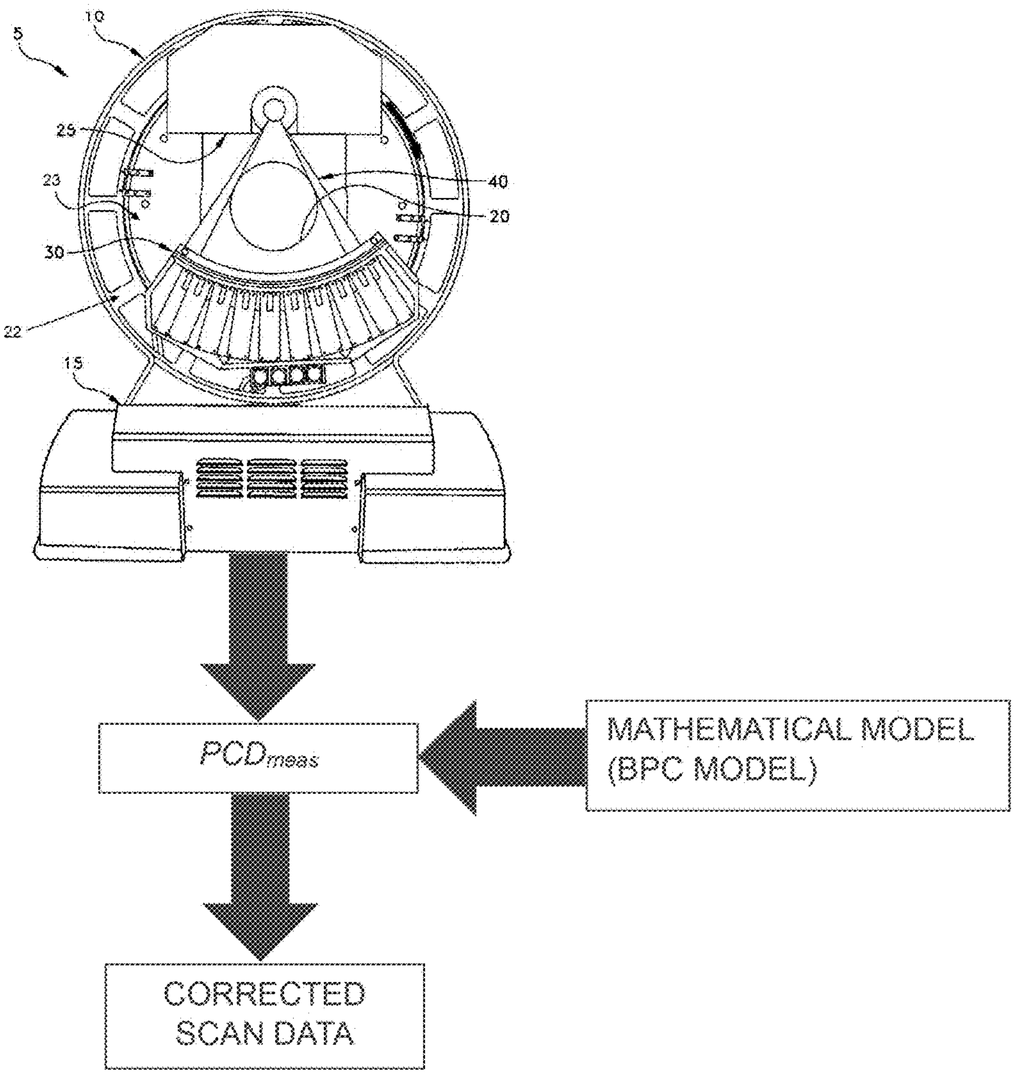
FIG. 5B is a schematic view showing a novel method for correcting data using a mathematical model derived in accordance with the present invention.

Looking now at FIG. 5B, it will be appreciated that once the correction factor (i.e., the mathematical/BPC model) is determined using the novel method discussed above, the correction factor may be applied to any CT machine 5 utilizing a PCD detector (e.g., a PCD detector 45) by applying the mathematical/BPC model to the scan data to generate a scan image from the corrected scan data.

Figure 8:
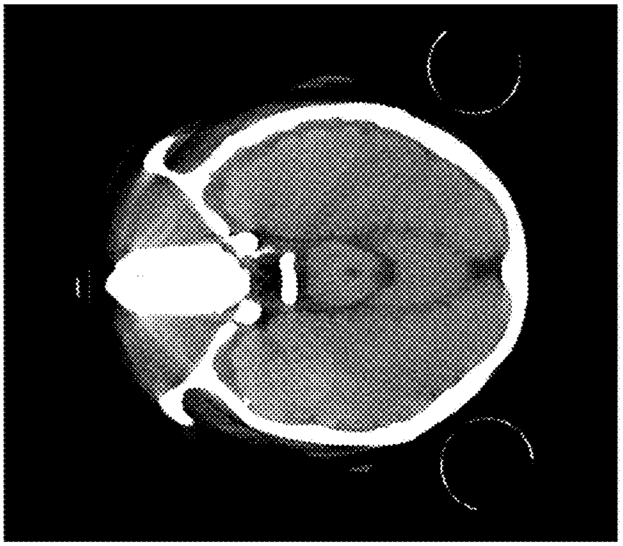
FIGS. 6-8 show exemplary images generated using raw (i.e., uncorrected) PCD X-ray detector data.
Figure 7:
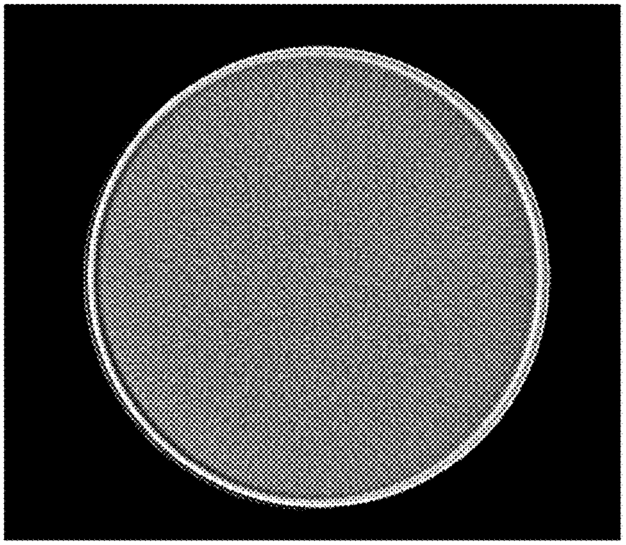
Figure 6:
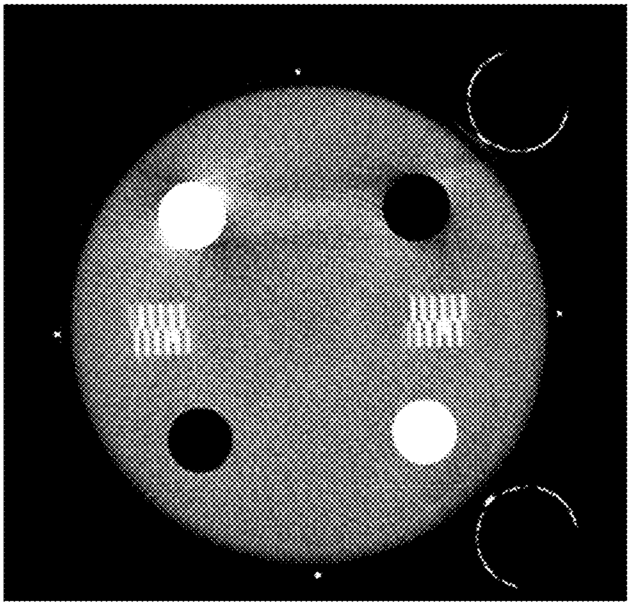

FIGS. 6-8 show exemplary images generated using raw (i.e., uncorrected) PCD X-ray detector data without any compensation for nonlinear (e.g., Pulse Pileup) characteristics of the PCD X-ray detector.

The non-uniform appearance of the images in FIGS. 6-8 is the result of the PCD nonlinearity discussed above. It is more visible in the head phantom image shown in FIG. 8 due to the non-circular shape of the human skull.

Figure 11:
FIGS. 9-11 show the images of FIGS. 6-8 after being "reconstructed" using corrected PCD measurements derived by applying the novel method of the present invention.
Figure 10:
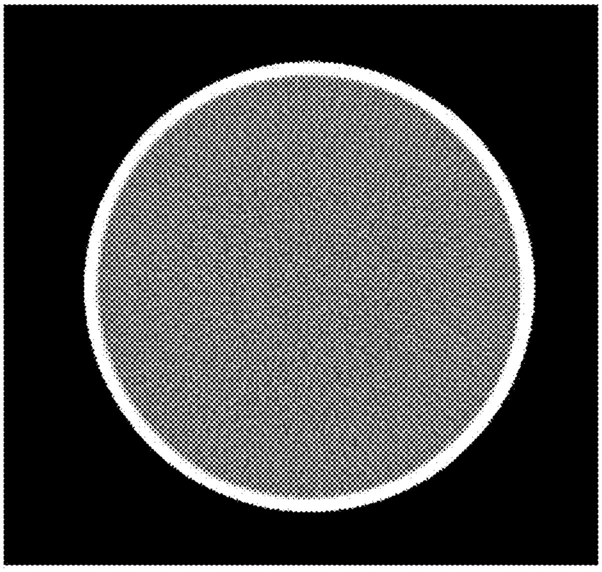
Figure 9:
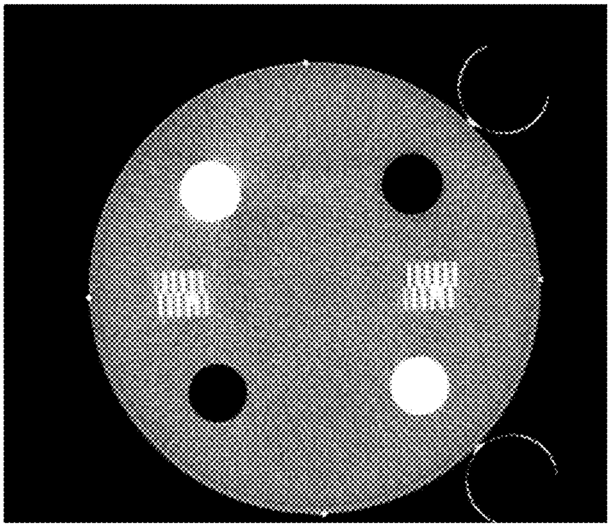

FIGS. 9-11 show the images of FIGS. 6-8 after being "reconstructed" using corrected PCD measurements derived by applying the novel method discussed above. The image uniformity of FIGS. 9-11 (i.e., relative to FIGS. 6-8) is greatly improved after compensating for the nonlinear effect of the PCD detectors.

Figure 14:
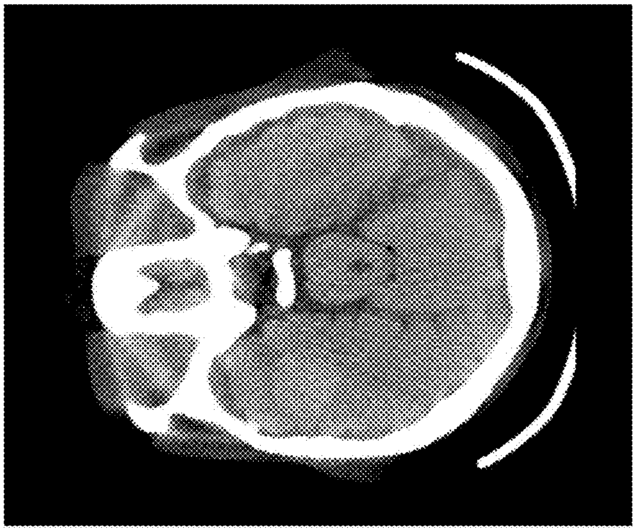
FIGS. 12-14 show exemplary images obtained using EID X-ray detector data.
Figure 13:
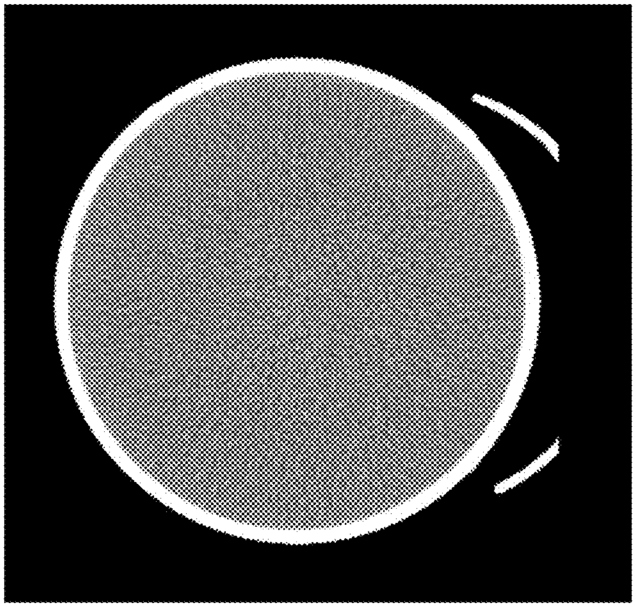
Figure 12:
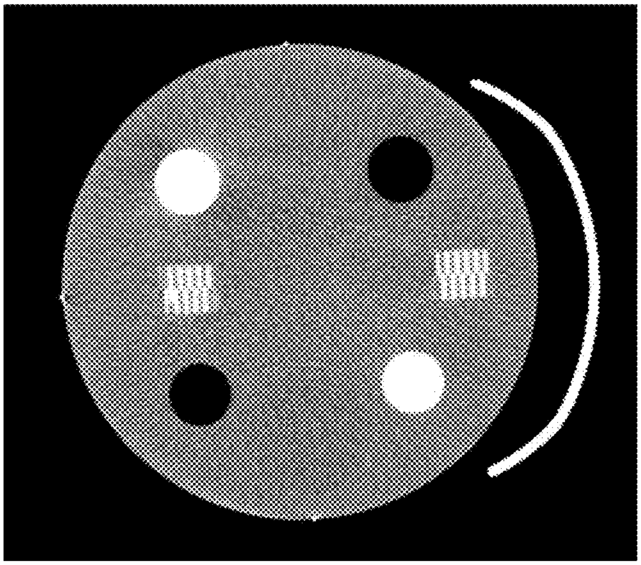

FIGS. 12-14 show images obtained using EID X-ray detector data. It will be appreciated that the images of FIGS. 12-14 generally closely resemble the images of FIGS. 9-11 obtained using corrected PCD measurements in accordance with the present invention.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A method for correcting the nonlinearity associated with photon counting detectors (PCDs) of imaging devices, the method comprising:

providing a first scanning device and a second scanning device, wherein each of the first and second scanning devices comprises an X-ray source configured to emit an X-ray beam and a detector array in alignment with the X-ray beam, wherein the detector array of the first scanning device comprises a plurality of energy integrating detectors (EID) and the detector array of the second scanning device comprises a plurality of photo counting detectors (PCD);

detecting an X-ray beam passed through an object to be scanned with the plurality of energy integrating detectors (EID);

detecting an X-ray beam passed through the object to be scanned with the plurality of photo counting detectors (PCD);

recording the X-ray beam detected by the plurality of energy integrating detectors (EID) as a first data set;

recording the X-ray beam detected by the plurality of photo counting detectors (PCD) as a second data set;

creating a mathematical model using the first data set and the second data set;

extracting selected data from the second data set to create a remaining data set from the second data set;

creating a data driven model using the remaining data set from the second data set to supplement the mathematical model, wherein the data driven model addresses limitations of the mathematical model and extends the correction range;

applying the mathematical model and the data driven model to the second data set so as to derive an attenuation factor;

applying the attenuation factor to the second data set; and generating a scan image of the object from the second data set.

2. The method according to claim 1 wherein the attenuation factor applied to the second data set corrects for the pulse pileup effect.

3. The method according to claim 1 wherein the attenuation factor applied to the second data set corrects for the charge sharing effect.

4. The method according to claim 1 wherein the first scanning device and the second scanning device comprise computerized tomography (CT) imaging machines.

5. The method according to claim 4 wherein the X-ray sources of the first scanning device and the second scanning device comprise X-ray tubes.

6. The method according to claim 5 wherein the X-ray beam emitted by the X-ray tubes is a polychromatic X-ray beam.

7. The method according to claim 4 wherein the computerized tomography (CT) imaging machines comprise identically configured computerized tomography (CT) imaging machines.

8. The method according to claim 1 wherein the extracted data from the second data set comprises data indicative of an unreliable outlier.

9. A method for correcting the nonlinearity associated with photon counting detectors (PCDs) of imaging devices, the method comprising:

providing a scanning device comprising an X-ray source configured to emit an X-ray beam and a first detector array in alignment with the X-ray beam, wherein the first detector array comprises a plurality of energy integrating detectors (EID);

detecting an X-ray beam passed through an object to be scanned with the plurality of energy integrating detectors (EID);

recording the X-ray beam passed through the object to be scanned and detected by the plurality of energy integrating detectors (EID) as a first data set;

replacing the first detector array with a second detector array, wherein the second detector array comprises a plurality of photo counting detectors (PCD);

detecting an X-ray beam passed through the object to be scanned with the plurality of photo counting detectors (PCD);

recording the X-ray beam passed through the object to be scanned and detected by the plurality of photo counting detectors (PCD) as a second data set;

creating a mathematical model using the first data set and the second data set;

extracting selected data from the second data set to create a remaining data set from the second data set;

creating a data driven model using the remaining data set from the second data set to supplement the mathematical model, wherein the data driven model addresses limitations of the mathematical model and extends the correction range;

applying the mathematical model and the data driven model to the second data set so as to derive an attenuation factor;

applying the attenuation factor to the second data set; and generating a scan image of the object from the second data set.

10. The method according to claim 9 wherein the extracted data from the second data set comprises data indicative of an unreliable outlier.

11. A system for correcting the nonlinearity associated with photon counting detectors (PCDs) of imaging devices, the system comprising:

at least one scanning device comprising an X-ray source configured to emit an X-ray beam;

a first detector array configured to be in alignment with the X-ray beam, wherein the first detector array comprises a plurality of energy integrating detectors (EID) for detecting the X-ray beam emitted by the X-ray source;

a second detector array configured to be in alignment with the X-ray beam, wherein the second detector array comprises a plurality of photo counting detectors (PCD) for detecting the X-ray beam emitted by the X-ray source;

a first data set representing an X-ray beam passed through an object and detected by the plurality of energy integrating detectors (EID);

a second data set representing an X-ray beam passed through the object and detected by the plurality of photo counting detectors (PCD); and a computer configured to (i) generate a mathematical model from the first data set and the second data set, (ii) extract data from the second data set to create a remaining data set from the second data set, (iii) generate a data driven model from the remaining data set of the second data set to supplement the mathematical model, wherein the data driven model addresses limitations of the mathematical model and extends the correction range, (iv) apply the mathematical model and the data driven model to the second data set so as to derive an attenuation factor, and (v) apply the attenuation factor to the second data set, whereby to generate a scan image of the object from the second data set.

12. The system according to claim 11 wherein the attenuation factor applied to the second data set corrects for the pulse pileup effect.

13. The system according to claim 11 wherein the attenuation factor applied to the second data set corrects for the charge sharing effect.

14. The system according to claim 11 wherein the system comprises a first scanning device comprising the first detector array and a second scanning device comprising the second detector array.

15. The system according to claim 14 wherein the first scanning device and the second scanning device comprise identically configured computerized tomography (CT) imaging machines.

16. The system according to claim 11 wherein the at least one scanning device comprises a computerized tomography (CT) imaging machine.

17. The system according to claim 16 wherein the X-ray source comprises an X-ray tube.

18. The system according to claim 17 wherein the X-ray beam emitted by the X-ray tube is a polychromatic X-ray beam.

19. The system according to claim 11 wherein the extracted data from the second data set comprises data indicative of an unreliable outlier.

20. A method for calibrating an imaging device comprising a photon counting detector (PCD), the method comprising:

providing (i) an X-ray source configured to emit an X-ray beam, (ii) a first detector array configured to be in alignment with the X-ray beam, wherein the first detector array comprises a plurality of energy integrating detectors (EID) for detecting the X-ray beam emitted by the X-ray source, and (iii) a second detector array configured to be in alignment with the X-ray beam, wherein the second detector array comprises a plurality of photo counting detectors (PCD) for detecting the X-ray beam emitted by the X-ray source;

detecting an X-ray beam passed through an object to be scanned with the plurality of energy integrating detectors (EID);

recording the X-ray beam passed through the object to be scanned and detected by the plurality of energy integrating detectors (EID) as a first data set;

detecting an X-ray beam passed through the object to be scanned with the plurality of photo counting detectors (PCD);

recording the X-ray beam passed through the object to be scanned and detected by the plurality of photo counting detectors (PCD) as a second data set;

generating a mathematical model from the first data set and the second data set;

extracting selected data from the second data set to create a remaining data set from the second data set;

generating a data driven model using the remaining data set from the second data set to supplement the mathematical model, wherein the data driven model addresses limitations of the mathematical model and extends the correction range;

applying the mathematical model and the data driven model to the second data set so as to derive an attenuation factor; and applying the attenuation factor to the second data set to calibrate the imaging device.

21. The method according to claim 20 further comprising generating a scan image of the object from the second data set after applying the attenuation factor to the second data set.

22. The method according to claim 20 wherein the attenuation factor applied to the second data set corrects for the pulse pileup effect.

23. The method according to claim 20 wherein the attenuation factor applied to the second data set corrects for the charge sharing effect.

24. The method according to claim 20 wherein a scanning device comprises the first detector array and the second detector array.

25. The method according to claim 24 wherein the scanning device comprises a computerized tomography (CT) imaging machine.

26. The method according to claim 20 wherein a first scanning device comprises the first detector array and a second scanning device comprises the second detector array.

27. The method according to claim 26 wherein the first and second scanning devices comprise identical computerized tomography (CT) imaging machines.

28. The method according to claim 20 wherein the extracted data from the second data set comprises data indicative of an unreliable outlier.

* * * * *